(No Model.)

N. C. TYLER.
STUFFING BOX.

No. 302,529. Patented July 22, 1884.

Witnesses.
W. R. Edelen.
Robt. H. Porter

Inventor.
N. C. Tyler
Per Hallock & Hallock
Att'ys

UNITED STATES PATENT OFFICE.

NATHAN C. TYLER, OF NORTH EAST, PENNSYLVANIA, ASSIGNOR OF ONE-HALF TO GEORGE W. STOCKTON, OF SAME PLACE.

STUFFING-BOX.

SPECIFICATION forming part of Letters Patent No. 302,529, dated July 22, 1884.

Application filed November 2, 1883. (No model.)

*To all whom it may concern:*

Be it known that I, NATHAN C. TYLER, a citizen of the United States, residing at North East, in the county of Erie and State of Pennsylvania, have invented certain new and useful Improvements in Stuffing-Boxes; and I do hereby declare the following to be a full, clear, and exact description of the invention, such as will enable others skilled in the art to which it appertains to make and use the same.

This invention relates to the construction of stuffing-boxes.

In the accompanying drawings the stuffing-box is shown upon the reciprocating piston-rod of a steam-engine, but it may be used upon rotating as well as reciprocating parts.

Figure 1:
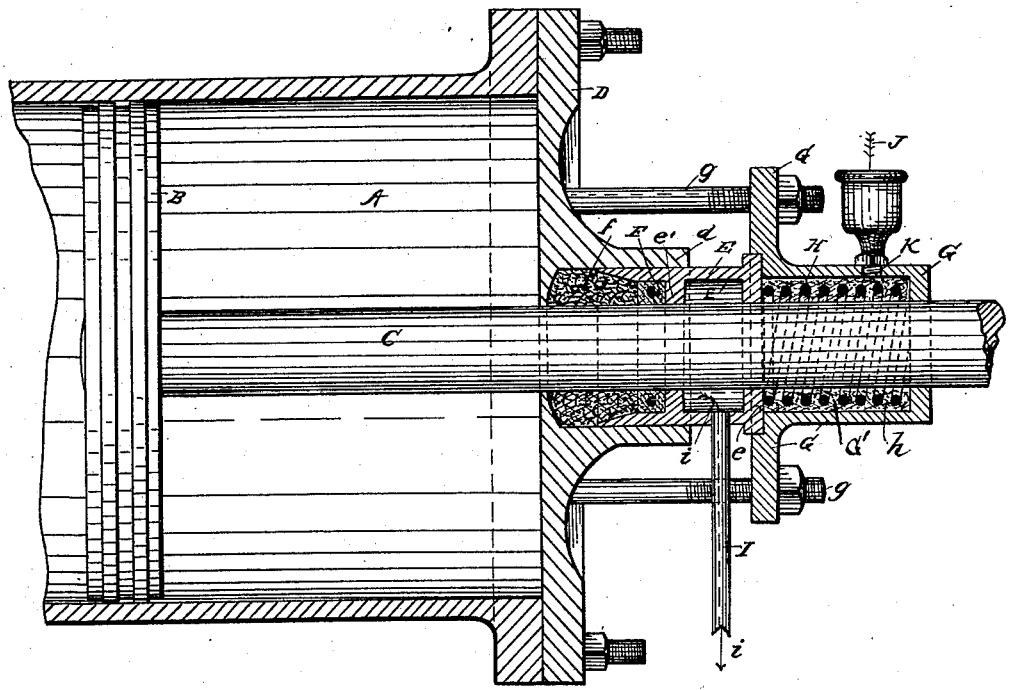
Figure 2:
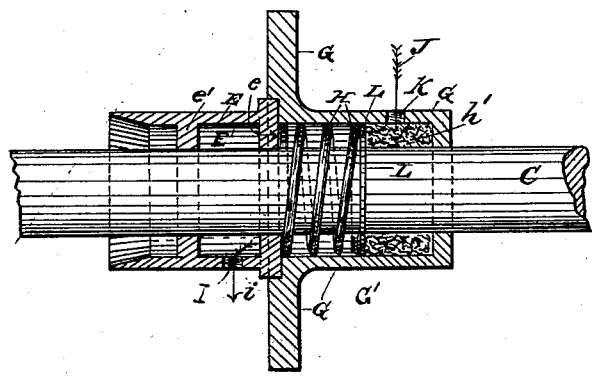

The drawings have two views, both of which are longitudinal sections. In Figure 2 a slight modification is shown.

The letters of reference indicate parts as follows: C is the piston-rod or other part to be packed. D is the cylinder-head or other part through which the part C passes, and upon which it is packed. E is the gland. F $f$ is the packing in the stuffing-box. G is the flanged part by which the gland is held in place by the bolts $g$. This is separate from the gland, and has within it an oil-box, G'. E' is a drip-chamber in the gland E, and I is a drip-pipe leading therefrom. Other letters of reference will appear in the general description following.

The objects of this invention are, first, to provide the gland of a stuffing-box with a drip-chamber, E', in which the drip will be caught, and from which it can be carried off, if desired; second, to provide a stuffing-box with an oil or lubricating box for properly lubricating the rod or part C.

There are other minor features of the invention which will appear hereinafter with a statement of their use and construction.

That part of the stuffing-box which is formed on the part D is of ordinary construction. The gland E, I make deeper in its packing-cup, and insert a packing-ring, F, besides using the ordinary stuffing, $f$. Back of the packing-cup I form a chamber, E', which will catch the drip that may escape past the packing, and prevents it from dropping onto the surrounding parts of the machine. A drip-pipe, I, may extend from this drip-chamber and convey the drippings to any point desired. The flange by which the gland is held in place by the bolts $g$ may be a part of the gland, as commonly, if desired, and the oil-cup before referred to need not be used if not wanted; but when the oil-cup is desired, I consider it desirable to put the flange onto the part G, in which the oil cup or chamber G' is formed, and set the end of the gland into a recess in the face of the flange, as shown in the drawings; but if desired, the gland E, and the oil-cup G', with the flange thereon, may be of one piece of metal, and the outer end of the cup G' be closed by a screw-cap. In the oil-cup G', I put a loose packing of waste or other absorbent, $h$, which is kept against the rod C by a coil-spring, H, upon which the waste or absorbent is wound or otherwise arranged. If desired, the arrangement shown in Fig. 2 may be employed. This consists in putting the waste at one end of the chamber G', and keeping it properly packed by a spring, H, at the other end of the chamber, a washer, L, being employed as a follower against the absorbent. The oil cup or chamber G' has an opening, K, to receive the oil, and an ordinary oil-cup, J, may be used as shown.

What I claim as new is—

1. In a stuffing-box, substantially as shown, the combination of the gland E with chamber E', the flanged part G with chamber G', the bolts $g\ g$, the drip-pipe I, spring H, and absorbent $h$, said parts being arranged together, as shown, and for the purposes mentioned.

2. In a stuffing-box, the combination of the gland E, having chamber E' and pipe I, and the chamber G', having feeding-cup J at or near the end opposite to the chamber E', substantially as described.

In testimony whereof I affix my signature in presence of two witnesses.

NATHAN C. TYLER.

Witnesses:
JNO. K. HALLOCK,
W. S. BROWN.